US005670222A

United States Patent [19]

Tanaka et al.

[11] Patent Number: 5,670,222

[45] Date of Patent: Sep. 23, 1997

[54] ATTACHMENT CONSTRUCTION FOR SHEET GLASS

[75] Inventors: Keisuke Tanaka; Kiminari Sugiura, both of Osaka, Japan

[73] Assignee: Nippon Sheet Glass Co., Ltd., Osaka, Japan

[21] Appl. No.: 561,981

[22] Filed: Nov. 22, 1995

[30] Foreign Application Priority Data

Dec. 1, 1994 [JP] Japan .................................... 6-297734

[51] Int. Cl.$^6$ .......................................................... B32B 4/00

[52] U.S. Cl. ................................. 428/34; 428/14; 428/44; 428/45; 428/46; 428/52; 428/75; 428/81; 428/122; 428/192; 428/425.6; 428/425.8; 428/426; 52/51; 52/508; 52/763

[58] Field of Search ................................ 428/14, 34, 192, 428/45, 44, 46, 49, 52, 425.6, 75, 76, 425.8, 426.81, 122; 52/508, 763, 511, 213, 51, 764

[56] References Cited

U.S. PATENT DOCUMENTS 3,081,504 3/1963 Bohnsack ................................. 20/56.4

*Primary Examiner*—Patrick Ryan
*Assistant Examiner*—Abraham Bahta
*Attorney, Agent, or Firm*—Felfe & Lynch

[57] ABSTRACT

An attachment construction for a sheet glass is disclosed. The construction includes a frame to be secured to a construction structure. A sheet glass is attached to this frame by fitting a peripheral edge of the sheet glass into the frame. A metal holder is disposed in contact with the peripheral edge of the sheet glass for holding the sheet glass. The sheet glass is attached to the frame via the holder member placed in contact with the sheet glass.

9 Claims, 5 Drawing Sheets

ATTACHMENT CONSTRUCTION FOR SHEET GLASS

BACKGROUND OF THE INVENTION

1. Field of the Invention

The present invention relates to an attachment construction for a sheet glass, and more particularly to a sheet-glass attachment construction for attaching a sheet glass to a frame (e.g. a sash) to be secured to a construction structure by fitting an edge of the sheet glass to the frame.

2. Description of the Related Art

Conventionally, a frame which a sheet glass is attached to and held by defines a groove into which the edge of the sheet glass is fitted. In compliance with predetermined regulations, this groove has a width which is predetermined to be greater than the thickness of the sheet glass. Then, the sheet glass is fitted into the groove with a fixing element being provided at a gap formed between a peripheral wall of the groove and the sheet glass.

FIG. 9 shows a known sheet-glass attachment construction for use at a fire-limit zone. In this, a frame 20, which consists essentially of a pair of angles, defines a glass fitting groove 20*a* in which a block 21 for setting made of calcium silicate is disposed. And, on this setting block, a peripheral edge of a sheet glass 22 is placed and also a rope 23, a sheet 24 made of ceramic fiber are press-fitted into each gap formed between opposed peripheral walls 20*b* of the frame 20 facing the groove 20*a* and the sheet glass, so that the peripheral edge of the sheet glass is firmly held by means of the resilience of the rope 23 or the sheet 24. In this manner, it is possible to prevent the sheet glass 22 or its support from being damaged in a fire which may occur in the zone.

In general, as the sheet glass 22, there is employed a wired sheet glass or a laminated glass incorporating an intermediate layer made of silica hydrate alkaline, which glasses are highly resistant against a heat cracking phenomenon. Namely, when a sheet glass is subjected to a significant heat, heat expansion occurring at the center area of the sheet glass applies a tension to the edge of the sheet glass fixedly supported to a window sash, for example. Then, when this tension exceeds the edge strength of the sheet glass, a cracking occurs in the sheet glass. This is the heat cracking phenomenon.

However, according to the conventional sheet-glass attachment construction described supra, the sheet glass is firmly held and supported by the sash. Then, when a fire occurs in a fire-limit zone for instance, the central area of the sheet glass is directly subjected to the combustion heat, whereas, the peripheral edge of the sheet glass fitted within the groove is less subjected to the combustion heat because of the heat insulating effect provided by the ceramic fiber. As a result, there develops a significant temperature difference between the central portion and the peripheral edge of the sheet glass, whereby the heat cracking phenomenon tends to occur.

More specifically, when the inexpensive soda-lime type sheet glass for construction is employed, the heat cracking phenomenon still tends to occur even if this glass is reinforced by an ordinary heat tempering treatment. Therefore, it is difficult for this sheet glass to pass the fire-resistant testing based on the Japanese Ministry of Construction Public Notice No. 1125.

In view of the above, a primary object of the present invention is to solve the above-described drawbacks of the prior art by providing a sheet-glass attachment construction which is highly resistant against the heat cracking phenomenon when the attached sheet glass is subjected to heat.

SUMMARY OF THE INVENTION

According to the invention, the construction for sheet glass has a frame secured to a construction structure, a sheet glass being attached to the frame by fitting a peripheral edge of the sheet glass into the frame; a metal holder member disposed in contact with the peripheral edge of the sheet glass for holding the sheet glass; wherein the sheet glass is attached to the frame via the holder member placed in contact with the frame.

With the above construction, heat may be smoothly conducted among the frame, the holder member and the peripheral edge of the sheet glass. For instance, when a fire occurs in a fire-limit zone, the combustion heat of the fire is conducted not only to the central portion of the sheet glass exposed to the zone but also to the peripheral edge of the glass through the frame and the holder member or through the holder member to the peripheral edge of the glass, thereby to minimize the temperature difference between the central portion of the sheet glass and the peripheral edge of the same. In this manner, in comparison with the construction supporting the peripheral edge of the sheet glass in a heat-insulated condition, the construction of the invention may reduce occurrence of the heat cracking phenomenon.

Therefore, with the sheet-glass attachment construction of this invention, it is possible to reduce the occurrence of the heat cracking phenomenon of the sheet glass and to improve the fire-resistant performance of the same.

According to a further aspect of the invention, the frame is made of a metal material.

With this, this frame will not be readily damaged in the case of a fire and may hold the sheet glass more reliably. In addition, the heat conduction may be further improved. Namely, the radiation heat generated from the fire-limit zone due to a fire or the like may be smoothly conducted from the frame via the holder member to the peripheral edge of the sheet glass. Hence, the occurrence of heat cracking phenomenon may be further reduced.

As a result, even if the construction employs, rather than the fire-resistant glass such as a wired sheet glass or a laminated glass, an ordinary soda-lime type heat-tempered construction sheet glass which is more vulnerable to breakage due to heat, this construction may still be used for forming a fire-limit zone, since this construction is sufficiently resistant against occurrence of heat cracking phenomenon. As results thereof, a wider variety of sheet glass may be used for the construction and the costs for forming such a fire-limit zone may be advantageously reduced through use of such inexpensive sheet glass.

Preferably, the holder member is capable of elastically holding the peripheral edge of the sheet glass.

With this, the holder member may hold the sheet glass further more reliably. In addition, even if the ambience temperature rises above the melting point (720 to 730 deg. C.) of the glass to cause the sheet glass attached to the frame to start melting or softening, the holder member is still capable of holding the peripheral edge of the sheet glass so as to prevent the edge from falling off the frame.

Preferably, the holder member includes, at a portion thereof contacting the sheet glass, a plurality of projections projecting toward the sheet glass.

According to the above construction, as the sheet glass starts melting or softening, the plurality of projections 'bite' into the softened surface of the sheet glass, thereby to hold the peripheral edge of the sheet glass more firmly.

As a result, even when the construction is subjected to a severe heating condition, the sheet glass will be hardly detached from the construction, so that the fire-resistance performance of the construction may be further improved.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of a sheet-glass attachment construction relating to the present invention will be described next with reference to the accompanying drawings.

Figure 1:
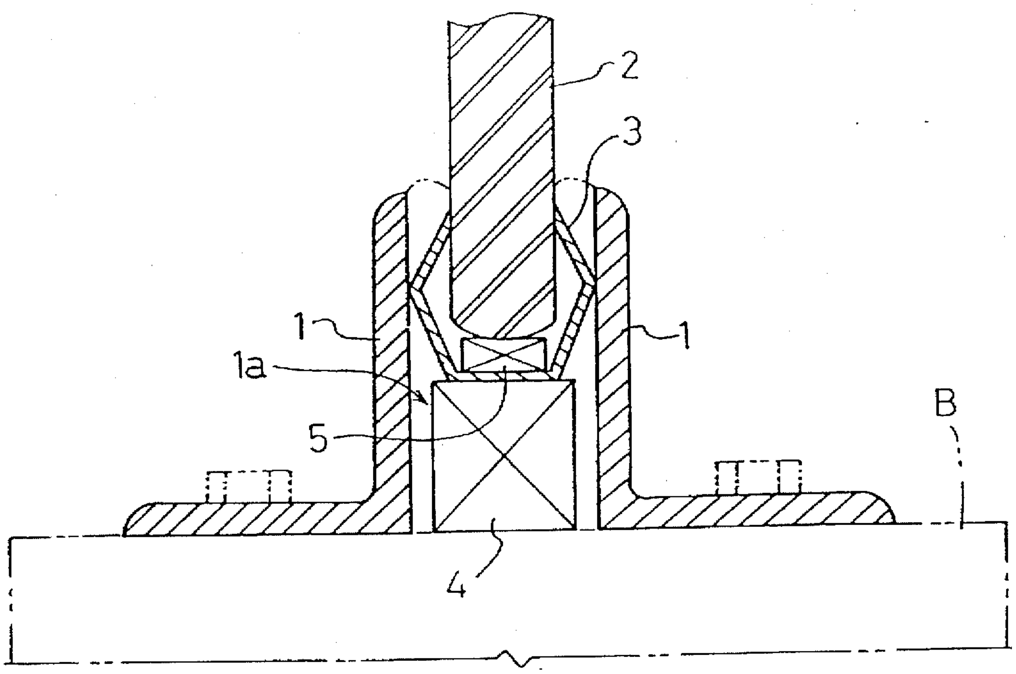
FIG. 1 is a section view of principal portions of a sheet-glass attachment construction according to one preferred embodiment of the present invention.

FIG. 1 shows a condition in which a fire-limit zone is provided by means of a sheet glass 2 as fitted to a pair of metal angles 1 (an example of a frame) secured to a construction structure B (an example of a construction), with a peripheral edge of the sheet glass 2 being supported to the angles 1 via a metal holder member 3.

The angles 1 may be formed of such material as iron, aluminum or the like. In particular, the angles should preferably have a strength sufficient to hold the sheet glass 2 and heat conduction characteristics for smoothly conducting radiation heat to the peripheral edge of the sheet glass 2. In addition, the angles 1 should, of course, have appropriate fire-resistant characteristics. Then, the pair of angles 1 are bolt-secured to a construction frame B with forming a space la therebetween for holding the sheet glass 2. And, at a bottom of the space 1*a*, there is disposed a first fire-resistant block 4 for setting made of calcium silicate and providing a shock absorbing effect for the sheet glass 2.

The sheet glass 2 comprises a soda-lime type construction sheet glass for a general construction use reinforced by tempering. In the tempering operation, the sheet glass is heated at a temperature range close to a softening point of the glass (720–730 deg. C.) and cooling air is sprayed under a high pressure against the glass over a continuous air-cooling area. The edges of the sheet glass 2 are ground to obtain curved faces so as to reduce concentration of stress associated with thermal distortion.

As shown, the holder member 3 has a gutter-like configuration having a hexagonal cross section with one side thereof eliminated therefrom. And, this member 3 is formed by bending of a metal plate to be elastically deformable. And, the peripheral edge of the sheet glass 2 is fitted into an opening 3*a* of the member 3 corresponding to the eliminated side of the hexagon (see FIG. 2).

Figure 2:
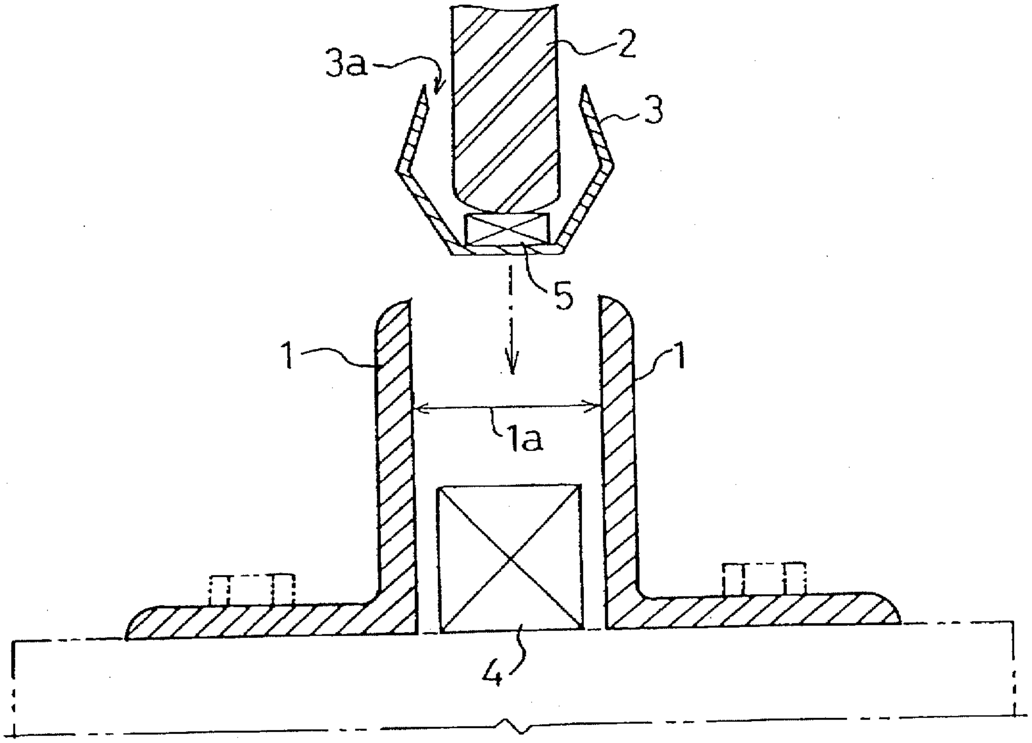
FIG. 2 is a section view of principal portions showing an attached construction of a sheet glass in the embodiment of FIG. 1.

As shown in FIG. 2, when the holder member 3 is out of the space 1*a*, the opening 3*a* of this member 3 has an opening width greater than the thickness of the sheet glass 2 and also a lateral cross-sectional width of the member 3 is greater than the opening width of the space 1*a*. Then, as the sheet glass 2 is introduced into the space 1*a* with the peripheral edge of the sheet glass 2 being fitted within the opening 3*a*, opposed outer peripheral faces of the holder member 3 come into contact with the angles 1 respectively. Further, as the holder member 3 is introduced together with the sheet glass 2, the holder member 3 is elastically deformed, by the reaction forces from the opposed angles 1, to be accommodated into the space 1*a* and the opposed side edges of the member 3 facing the opening 1*a* elastically bind therebetween the peripheral edge of the sheet glass 2. In this manner, the sheet glass 2 is attached.

Further, at a bottom of the holder member 3 too, there is provided a second setting block 5 similar to the first setting block 4 described above.

The above-described sheet-glass attachment construction, though using the soda-lime type sheet glass (tempered) for a general construction use as described supra, can satisfy the requirements of the class A fire-resistant windowpane as specified by the Japanese Construction Ministry Public Notice No. 1125.

Incidentally, in the fire-resistant testing mentioned above, a windowpane to be tested is subjected to heating steps effected in accordance with a heat-resistance testing heating curve. Then, depending on the change occurring in the windowpane due to the heating, this windowpane is determined as the class A or class B.

More specifically, in the case of class B, it is required that no combustion or damage occur in the windowpane after 20 minutes of the heating according to the heat-resistance testing heating curve until the temperature of the windowpane reaches 795 deg. C.

In the case of class A, it is required that the softened windowpane not fall off the frame after additional 40 minutes (60 minutes in total) of the heating according to the heat-resistance testing heating curve until the window pane reaches 925 deg. C.

According to the above-described sheet-glass attachment construction of the instant embodiment, after the 20 minute heating specified for the class B fire-resistant windowpane, there develops only a smaller temperature difference of 260 deg. C. approximately between the central portion and the peripheral edge of the sheet glass (in comparison with the difference of approximately 360 deg. C. in the case of the conventional construction), so that the thermal stress occurring at the peripheral edge of the sheet glass may be restricted to 2000 $kgf/cm^2$ (2600 $kgf/cm^2$ in the case of the conventional construction). Further, as the peripheral edge of the sheet glass is elastically held by the holder member, the peripheral edge of the sheet glass may be still held reliably by the holder even after the sheet glass becomes softened after the total 60 minute heating specified for the class A fire-resistant windowpane.

Next, other embodiments of the invention will be specifically described.

Figure 3:
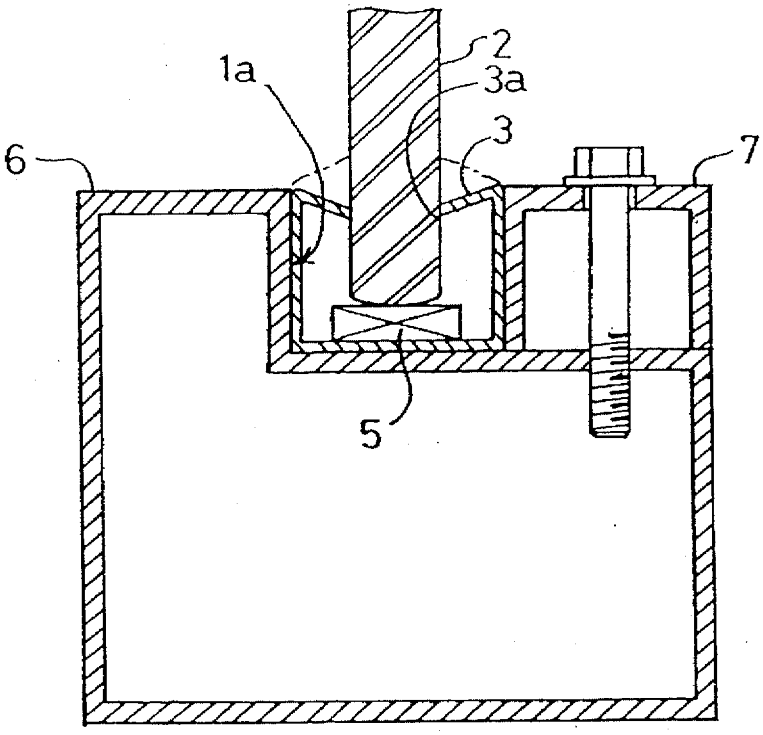
FIG. 3 is a section view of principal portions of a sheet-glass attachment construction according to a further embodiment of the invention.

[1] The frame is not limited to the type described in the foregoing embodiment comprised of the angles. For instance, as shown in FIG. 3, the frame can be comprised of a sash 6 and a press edge 7. This construction is advantageous for facilitating the attachment operation of the sheet glass to the frame. In addition, by replacing the press edge 7 by another of a different size, it is readily possible to adjust the opening width of the space 1*a* for introducing the sheet glass. As a result, even if the sheet glass has a differing thickness, such glass too may be attached appropriately.

The holder member 3 too is not limited to the type having such cross sectional shape as described in the foregoing embodiment. For example, as shown in FIG. 3, the holder member can be formed so as to come into face-contact with the peripheral edge of the sheet glass. Then, with rise in the ambience temperature, this holder member may more smoothly receive the heat from the frame and conduct the heat to the peripheral edge of the sheet glass, whereby it becomes easier to restrict development of temperature difference between the peripheral edge and the central portion of the sheet glass.

Figure 4:
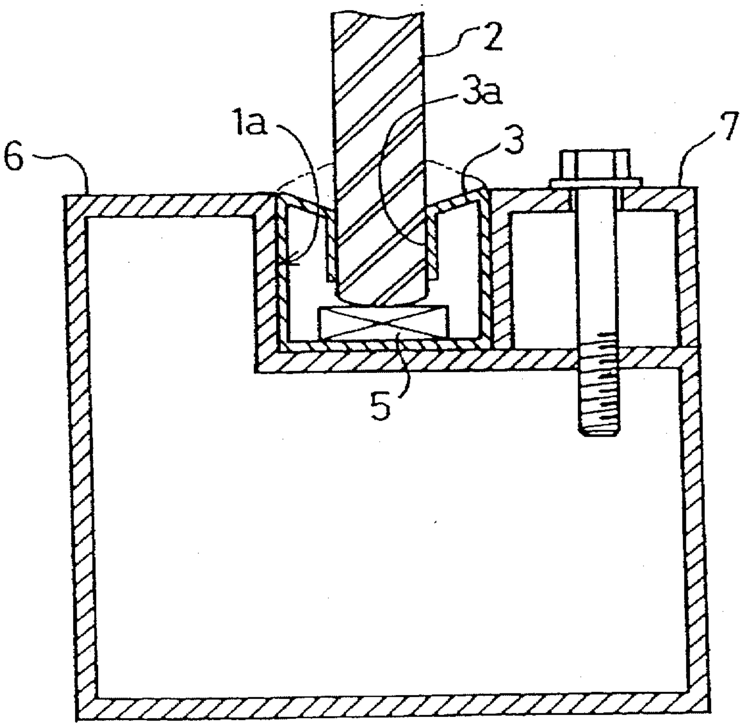
FIG. 4 is a section view of principal portions showing a sheet-glass attachment construction according to a still further embodiment of the invention.

[2] As shown in FIG. 4, the holder member 3 can be formed so as to come into face-contact with the peripheral edge of the sheet glass 2. With this, the heat conduction may be effected still more smoothly, thereby to further restrict the development of temperature difference within the sheet glass.

Figure 6:
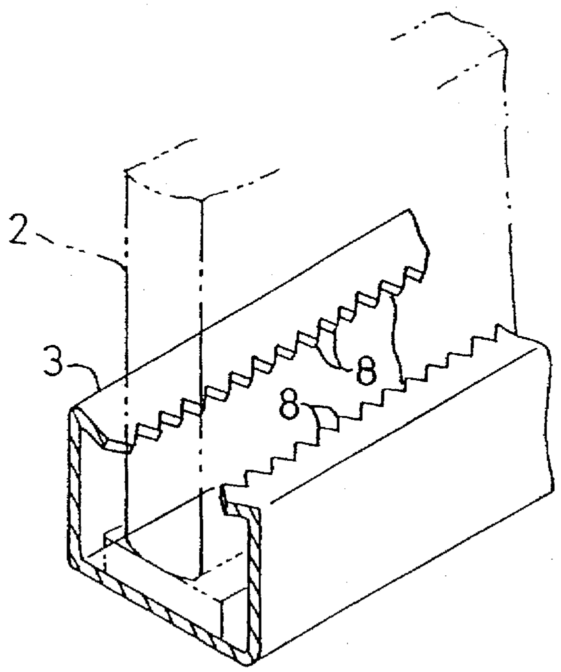
FIG. 6 is a perspective view showing a holder member relating to a still further embodiment.

[3] As shown in FIG. 6, the holder member 3 can include, at its portions for contacting the sheet glass, a plurality of projections 8 projecting toward the sheet glass 2. With this, when the sheet glass 2 becomes softened in association with rise in the ambience temperature, the projections 8 bite into the sheet glass to firmly hold the same.

Figure 5:
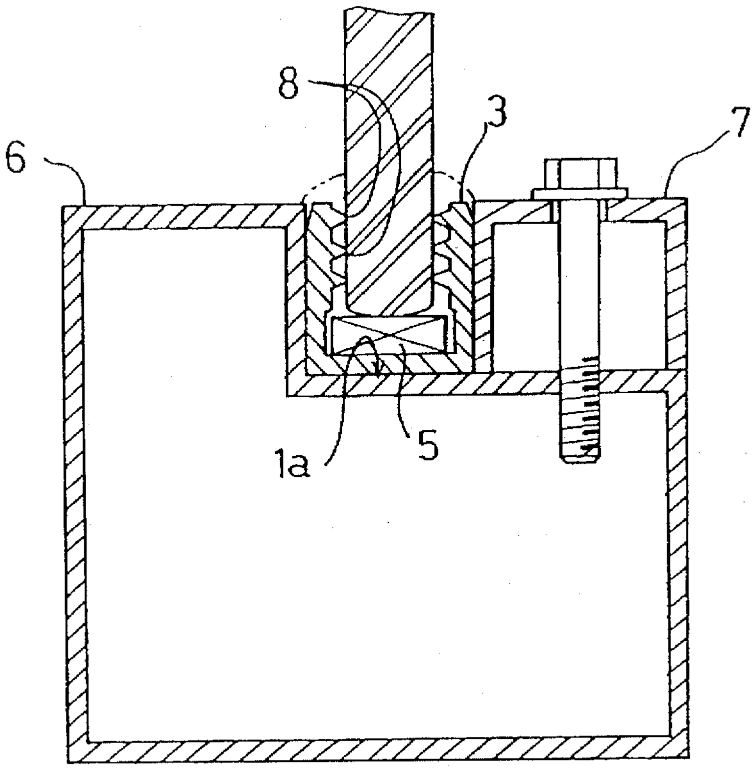
FIG. 5 is a section view of principal portions showing a sheet-glass attachment construction according to a still further embodiment of the invention.

[4] The projections 8 can be alternatively formed as shown in FIG. 5. This too can achieve the same effect as the construction of FIG. 6.

Figure 7:
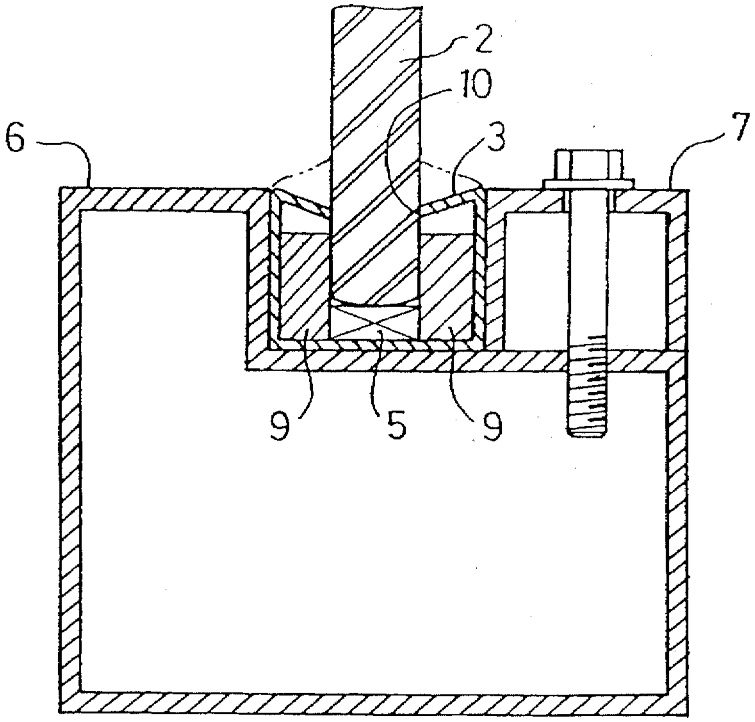
FIG. 7 is a section view of principal portions showing a sheet-glass attachment construction according to a still further embodiment of the invention.

[5] Further, as shown in FIG. 7, the holder member 3 can separately include a heat-conducting portion 9 which comes into face-contact with the peripheral edge of the sheet glass for bettering the heat conduction and a biting portion 10 which bites into the sheet glass 2 when this glass 2 is softened. In the case of this construction, the heat-conducting portion 9 functions to improve the heat conduction to the sheet glass 9 thereby to restrict the occurrence of heat cracking phenomenon and the biting portion 10 functions to prevent falling of the sheet glass when the glass is softened.

Figure 8:
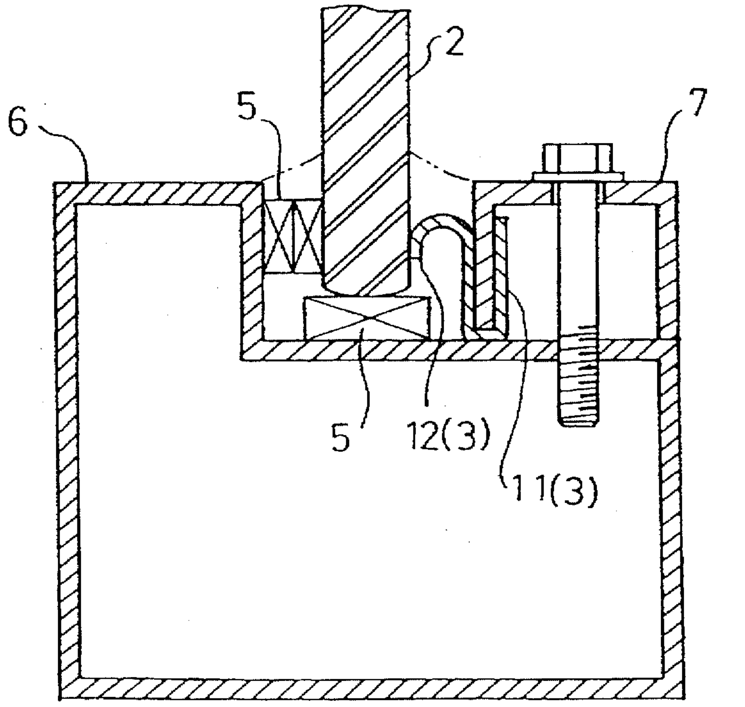
FIG. 8 is a section view of principal portions showing a sheet-glass attachment construction according to a still further embodiment of the invention.
Figure 9:
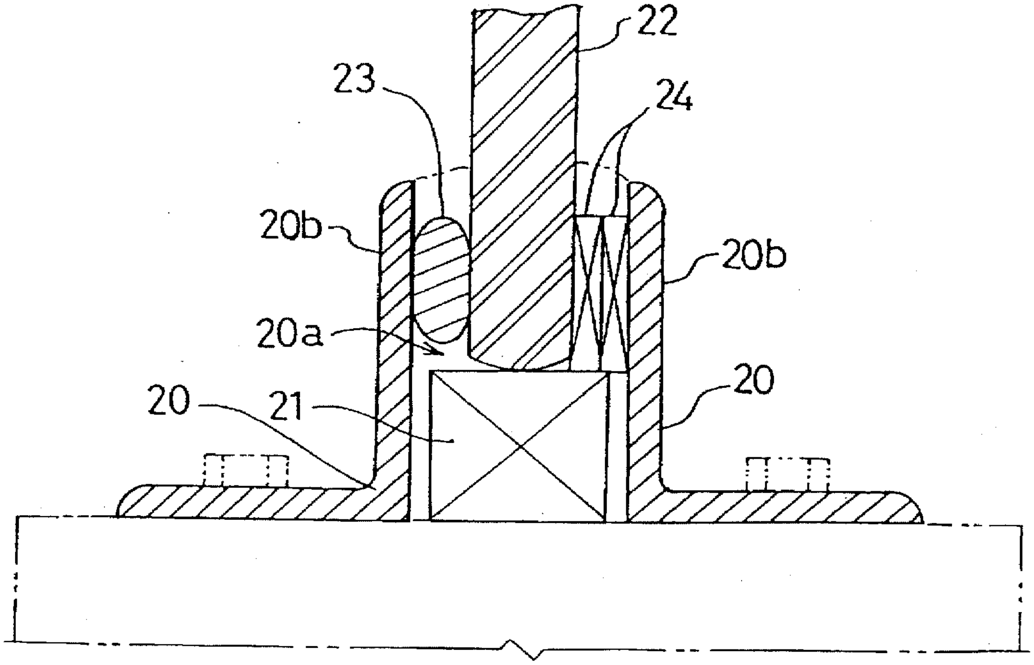
FIG.9(PRIOR ART)
FIG. 9 is a section view of principal portions showing a sheet-glass attachment construction according to the prior art.

[6] Still further, the holder member 3 can be formed as shown in FIG. 8. Namely, this holder member 3 includes, on one side thereof, an engaging portion 11 engageable with the press edge 7 and includes, on the other side thereof, a pressing portion 12 which may be elastically depressed through its contact with one face of the sheet glass 2. Then, as this holder member 3 is attached to the sash 6 as being engaged with the press edge 7, the sheet glass 2 may be fixedly held between the pressing portion 12 and the sash 6. In this case, the setting block 5 will be interposed between the sash 6 and the sheet glass 2. Incidentally, this setting block 5 may be placed in continuous contact with the entire lengths of the sash 6 and the sheet glass 2, or in an intermittent contact with the same. With this holder member, with the attachment of the press edge 7 to the sash 6, the sheet glass 2 may be held and supported simultaneously. Consequently, the efficiency of the glass-sheet attaching operation may be improved.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An attachment construction for a sheet glass, which comprises:
   - a metal frame to be secured to a construction structure, a sheet glass being attached to the frame by fitting a peripheral edge of the sheet glass into the frame;
   - a metal holder member disposed in direct contact with the peripheral edge of the sheet glass for holding the sheet glass; and
   - the sheet glass being attached to the frame via the holder member placed in direct contact with the frame, whereby heat may be readily conducted from the glass to frame.

2. An attachment construction as defined in claim 1, wherein said holder member is capable of elastically holding the peripheral edge of the sheet glass.

3. An attachment construction as defined in claim 2, wherein said holder member has a gutter-like configuration having a hexagonal cross section with one side thereof being eliminated therefrom.

4. An attachment construction as defined in claim 1, wherein said frame includes a sash and a press edge, and said holder member is formed so as to come into face-contact with said sash and said press edge.

5. An attachment construction as defined in claim 4, wherein said holder member is formed so as to come into face-contact with the peripheral edge of the sheet glass.

6. An attachment construction as defined in claim 1, wherein said holder member includes a heat conducting portion for coming into face-contact with the peripheral edge of the sheet glass for bettering heat conduction thereto and a biting portion for biting into the sheet glass when this sheet glass is softened.

7. An attachment construction as defined in claim 1, wherein said holder member includes, at a portion thereof contacting the sheet glass, a plurality of projections projecting toward the sheet glass.

8. An attachment construction as defined in claim 2, wherein said frame is made of metal, and said holder member includes, at a portion thereof contacting the sheet glass, a plurality of projections projecting toward the sheet glass.

9. An attachment construction as defined in claim 1, wherein said holder member includes, on one side thereof, an engaging portion engageable with a press edge and include, on the other side thereof, a pressing portion which may be elastically depressed through its contact with one face of the sheet glass, and said holder member is attached to a sash as being engaged with the press edge.

* * * * *